United States Patent [19]
Sakakibara

[11] 3,752,252
[45] Aug. 14, 1973

[54] METHOD AND APPARATUS FOR CONTROL OF A VEHICLE CONSTANT SPEED MECHANISM

[75] Inventor: Naoji Sakakibara, Kariya, Japan

[73] Assignee: Aisin Seiki Kabushiki Kaisha, Aichi Prefecture, Japan

[22] Filed: July 6, 1971

[21] Appl. No.: 159,969

[30] Foreign Application Priority Data
July 3, 1970    Japan.............................. 45/58594
July 3, 1970    Japan.............................. 45/58595

[52] U.S. Cl. ............................ 180/105 E, 123/102
[51] Int. Cl. ................................................ B60k 31/00
[58] Field of Search ....................... 180/105, 105 E; 123/102

[56] References Cited
UNITED STATES PATENTS

| | | | |
|---|---|---|---|
| 3,455,411 | 7/1969 | Carp et al. ..................... | 180/105 R |
| 3,476,205 | 11/1969 | Kato................................. | 180/105 R |
| 3,485,316 | 12/1969 | Slavin et al. ..................... | 180/105 R |
| 3,612,017 | 10/1971 | Ishizaki et al. .................. | 180/105 E |
| 3,659,571 | 5/1972 | Lang................................. | 123/102 |

Primary Examiner—Kenneth H. Betts
Attorney—Richard C. Sughrue et al.

[57] ABSTRACT

A method and apparatus for control of a vehicle at constant speed. An actual vehicle speed signal is developed and when it is desired to operate the vehicle continuously at this actual speed, the actual speed is stored in a memory. A negative feedback signal responsive to the opening degree of the throttle valve is applied to the storage means storing the desired vehicle speed and varies the stored desired vehicle speed in accordance with the opening degree of the throttle valve. The actual vehicle speed signal is then brought into coincidence with the desired vehicle speed, thus maintaining the vehicle at a constant speed equal to the desired vehicle speed.

7 Claims, 7 Drawing Figures

METHOD AND APPARATUS FOR CONTROL OF A VEHICLE CONSTANT SPEED MECHANISM

This invention relates to improvements in and relating to a method and an apparatus for control of a vehicle constant speed device, especially adapted for fitting on a powered and wheeled vehicle, preferably an automotive vehicle, wherein a preferred running speed is established as the standard for continued travel of the vehicle and reserved in a memory employed in said device and the occasionally manipulated opening degree of the engine fuel throttle valve means of the vehicle is fed back to said device for the desired control purpose.

In the conventional device of the above kind, the operation is such that at the time of the establishment of a desirous vehicle speed, the vehicle speed and the throttle opening degree are preserved in the memory. No troubles may generally be encountered in this respect, when the vehicle is travelling substantially at a constant vehicle speed and on a smooth and horizontal travelling course. On the other hand, however, when the vehicle is being subjected to an acceleration in its travelling speed by opening the throttle to a wider opening degree, as an example, and the control reference speed is established under such travelling conditions, the vehicle speed will generally become higher than the desired one, and vice versa.

The main object of the invention is to provide an improved method and an apparatus of the kind above referred, to yet capable of obviating substantially the aforementioned conventional drawbacks.

This and further objects, features and advantages of the invention will become more apparent as the description proceeds, especially when read the following detailed description of the invention by reference to the accompanying drawings illustrative substantially two preferred embodiments of an apparatus adapted for carrying out the method of the invention.

Referring now to the accompanying drawings, two preferred embodiments of the invention will be described hereinbelow in detail.

Figure 1:
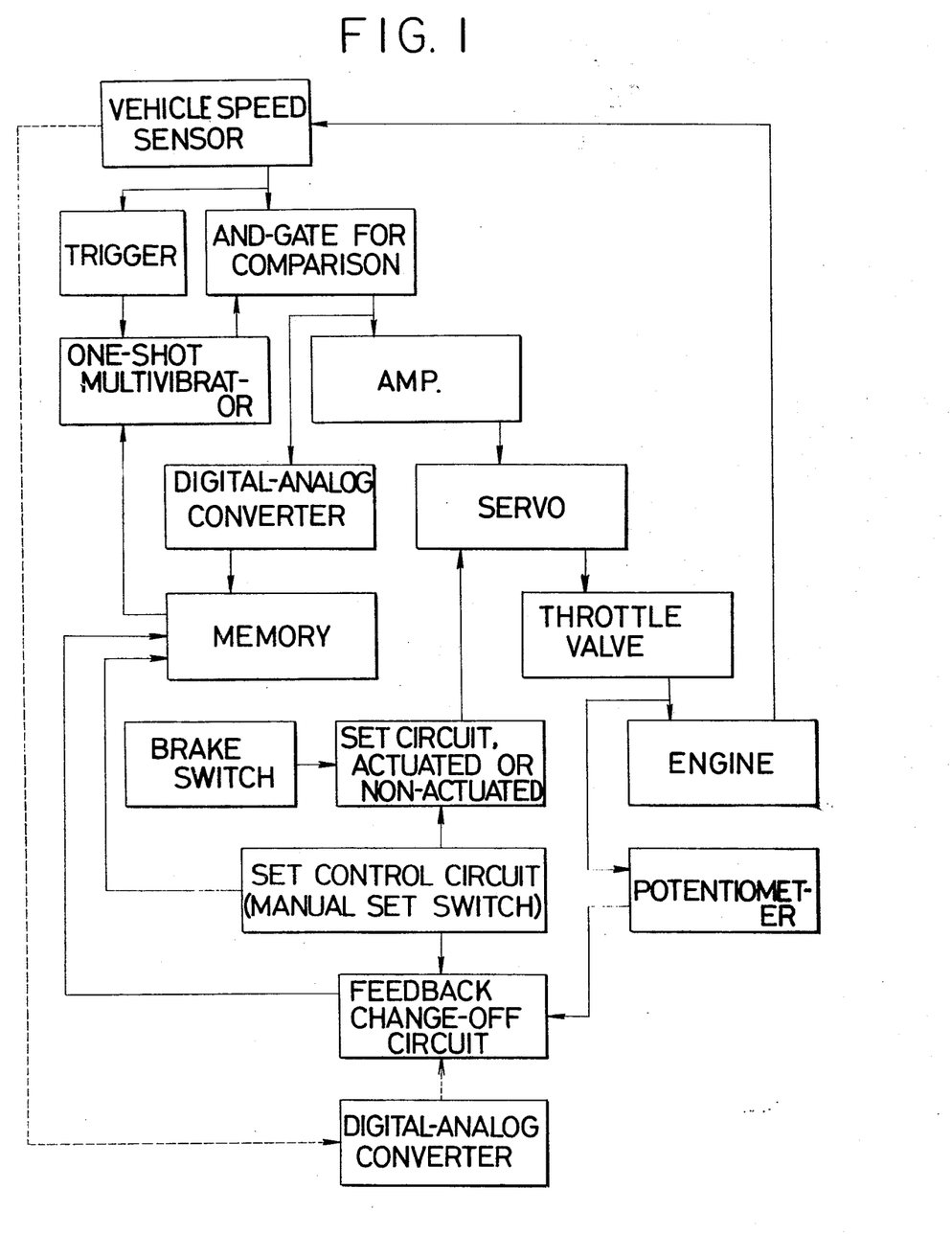
FIG. 1 represents a block diagram illustrative of a constant speed vehicle travel control arrangement embodying the control device according to the invention.

FIG. 1 represents a general arrangement in its block form of a constant speed vehicle travel control arrangement comprising convential parts and improved parts. By reference to the detailed description to be set forth, the invention can be more fully understood in consultation with this block diagram.

Figure 2:
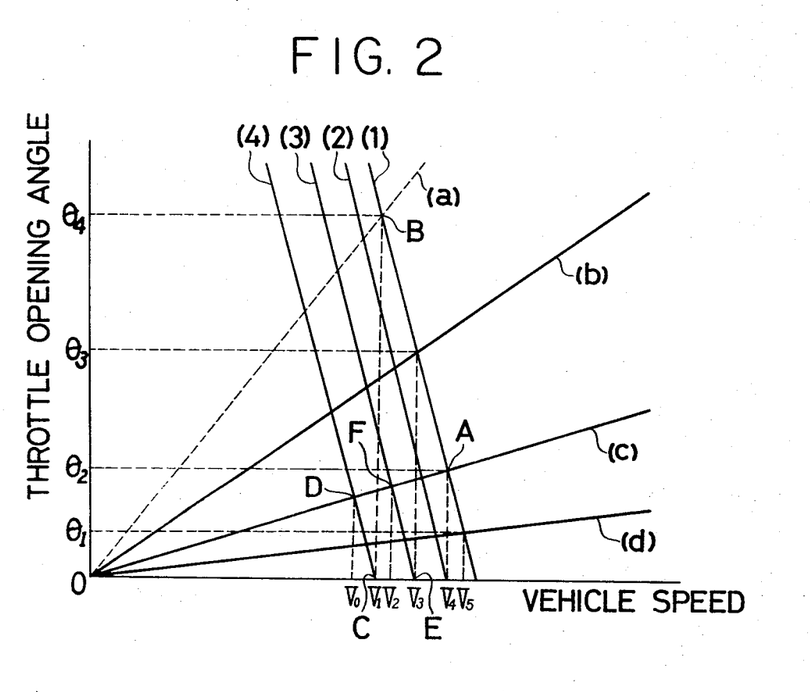
FIG. 2 is a schematic and explanatory chart showing the characteristic performance of a conventional constant speed controller commonly employed in automotive vehicles and constituting the background of the invention as well as the improved performance obtainable by the present invention.

In advance of the initiation of detailed description of the embodiments, the general working performance of the conventional automotive constant speed vehicle travel control mechanism is explained briefly by reference to FIG. 2.

In the chart in FIG. 2, several curves (1), (2), (3) and (4) represent respective performance characteristics of the conventional mechanism of the above kind, which characteristics are responsive to the power of the vehicle, the travelling resistance of the vehicle and the loaded and the like conditions thereof, the characteristic curve shifting left to right successively through (4), (3), (2) and (1) with increase of the established speed and substantially in a parallel relationship as shown.

In FIG. 2, several vehicle travel characteristic curves are also shown at (a), (b), (c) and (d) by way of example. Curve (a) represents that which will appear when the vehicle travels up along a substantially steeply rising traffic road surface. Curve (b) represents that which will be obtained when the vehicle travels up along a rather gently steep traffic surface. On the other hand, curve (c) which will appear when the vehicle travels along an even and smooth traffic surface. Curve (d) represents that which will appear when the vehicle runs down along a downwardly sloped surface.

in the conventional mechanism of the above kind, the vehicle speed and the throttle opening degree are preserved in the memory of the mechanism in case of the establishment of a desirous vehicle speed by the vehicle driver.

When a reference vehicle speed is set during a period when the vehicle speed is being substantially accelerated, the corresponding speed $V_1$ and throttle opening degree $\theta_4$ will be stored in the memory. If the vehicle should thereafter travel without the rapid acceleration and onto a flat and smooth traffic surface, the vehicle speed and the throttle opening degree will be at $V_4$ and $\theta_2$ corresponding to those as measured at a crossing point A which is the intersection of the curve (1) with the curve (c). Therefore, the vehicle will travel at a constant speed higher by $(V_4 - V_1)$ than the beforehand set speed $V_1$.

If, a reference vehicle speed is set when the vehicle is running along a downward slope, it will continue to travel at the set velue, so far as the vehicle downwardly travels along the same slope. But, if the vehicle then travels on an even or a rising traffic surface, the vehicle speed will reduce to $V_4$ or $V_3$, as an example, and so on.

Therefore, in the case of a conventional mechanism of the above kind, the memory will store the relationship between the occasional vehicle speed and throttle opening degree at the time and under the conditions when the reference speed is set thus the relationship between $V_1$ and $\theta_4$ in case of a rapid acceleration; between $V_3$ and $\theta_3$ in case of travelling along a rising slope; between $V_4$ and $\theta_2$ in case of running along a horizontal traffic surface; and between $V_5$ and $\theta_1$ in case of downward running on a descending slope, respectively, being brought into memory speed actually attained will vary in each case from that specifically selected out for setting. More specifically, the attained speed will correspond to those appearing at the respective intersecting points of characteristic curve (1) with respective travel characteristic curves (b), (c) and (d). Therefore, it will be seen that the vehicle speed deviation of the actual speed from the set value is not predictable. As an example, upon setting a desired vehicle travel speed during a rapidly accelerating stage on a ramp way, the attained speed using the system will become appreciably higher than the set value desired by the driver. Similar defects will be encountered with a constant speed vehicle travel control device when the vehicle continues to accelerate during depression of a manipulating switch and the maximum attained vehicle speed is set into memory by release of the same switch.

The specific object of the invention resides in the removal of the aforementioned kind of conventional drawback.

Referring now to FIGS. 1-6 of the accompanying drawings, the first embodiment of the invention will be described hereinunder in detail.

Figure 3:
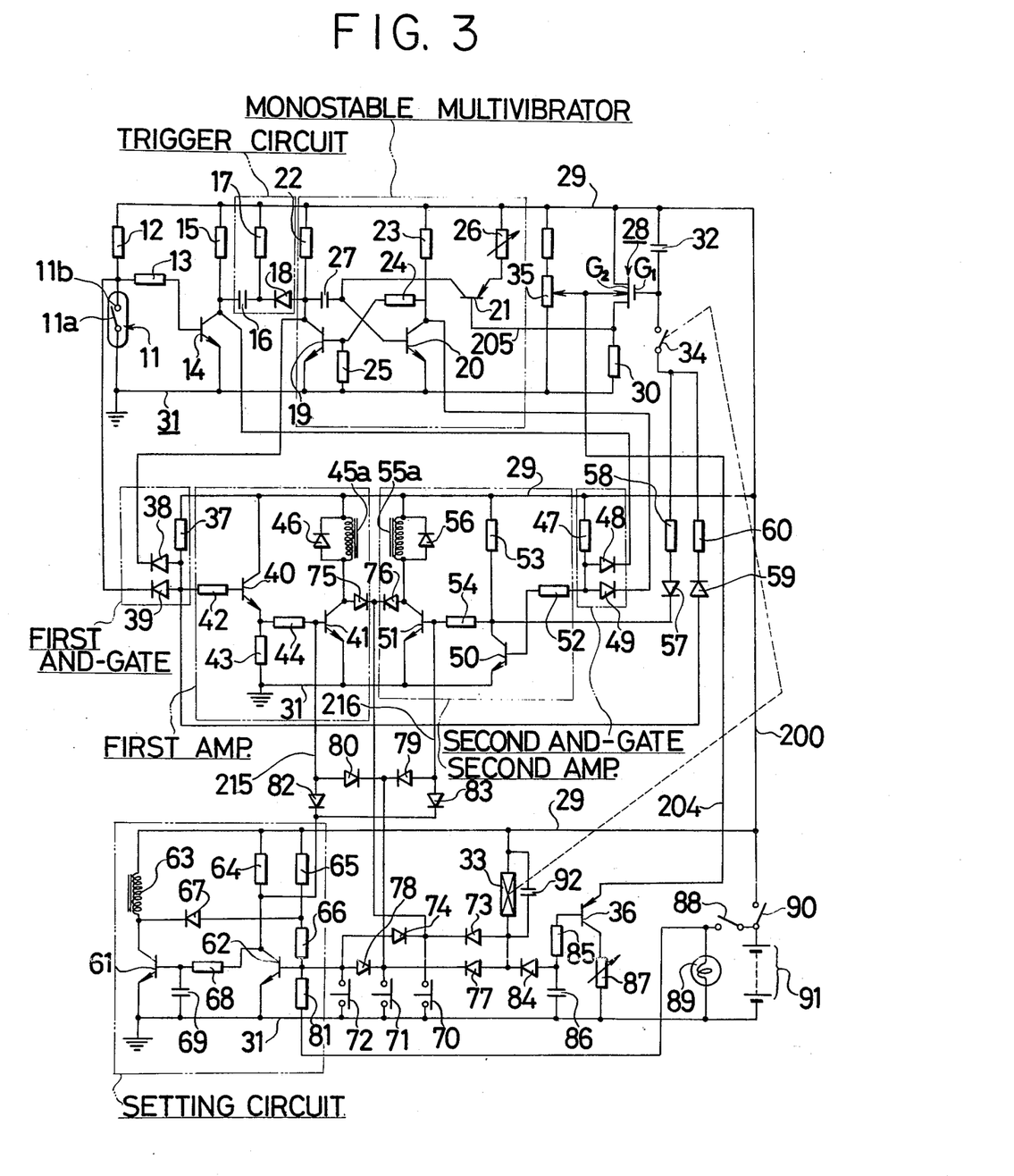
FIG. 3 is an electric wiring diagram of a first embodiment of the apparatus adapted for carrying out the inventive method.
Figures 4, 5:
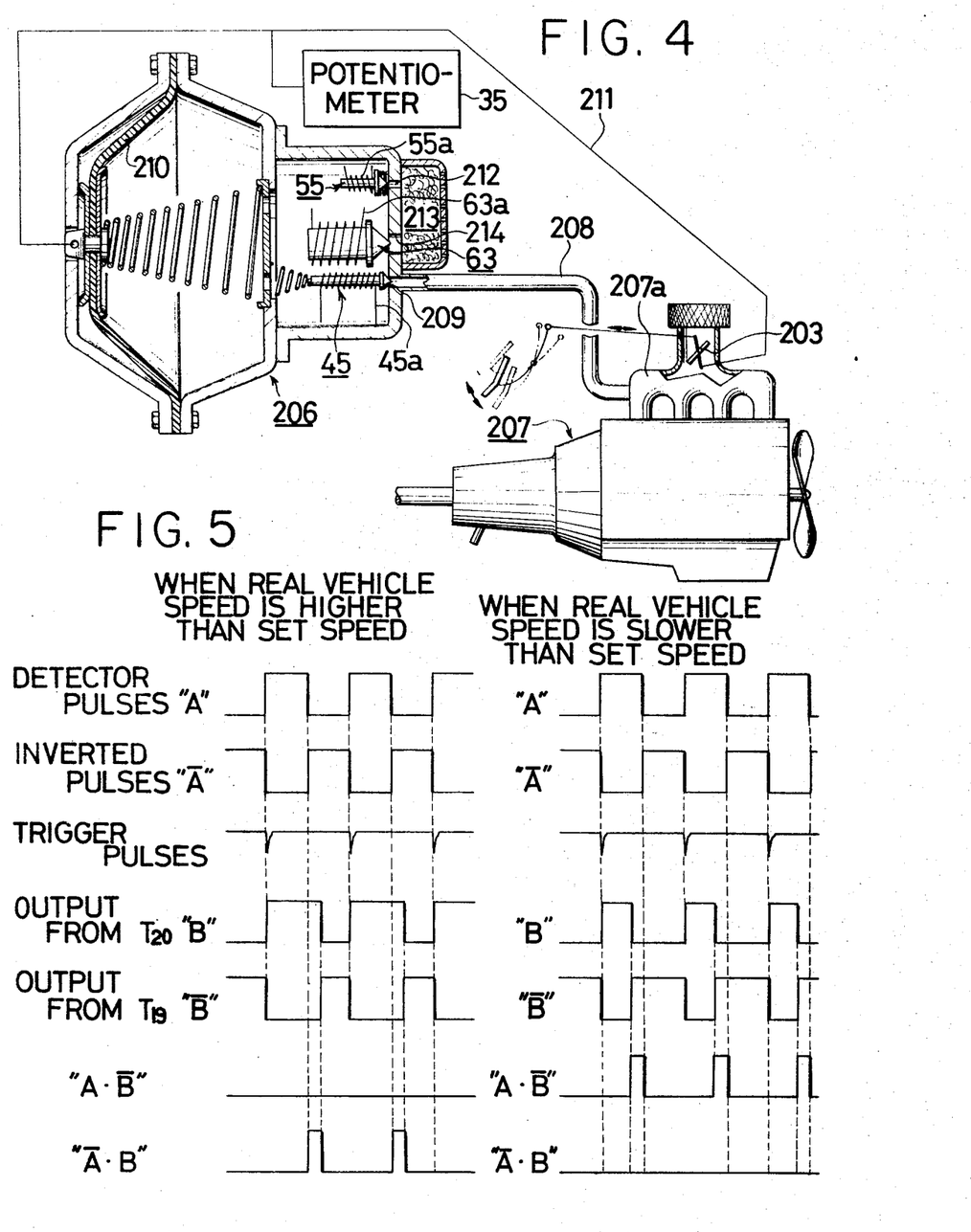
FIG. 4 is a schematic and partially sectional view of a combination of a vacuum servo-unit with a automotive drive engine which combination is operable under the action of the control circuit shown in FIG. 3.
FIG. 5 is a schematic that representing two series of wave forms appearing at several portions in FIG. 3.
Figure 6:
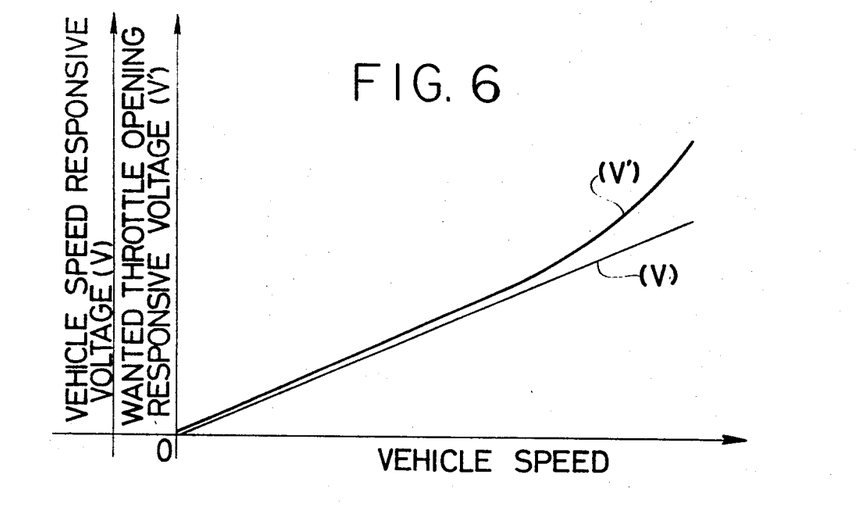
FIG. 6 is a schematic and explanatory chart illustrative of the relationship between the vehicle travelling speed and the voltage responsive to throttle opening degree.

In FIG. 3, numeral 11 represents schematically a magnetically operated lead switch, adapted for being closed once, as an example, per every revolution of one of the wheels of an automotive vehicle, not shown. This lead switch 11 is called frequently "detector" throughout the specification and appended claims. With higher vehicle speed, represented by wheel speed as will be apparent from the foregoing, the on-off cycle as well as the on-period of the switch 11 becomes shoter correspondingly. The switch 11 comprises movable contact 11a and stationary contact 11b which is electrically connected through positive bus line 29 and lead 200 and main switch 90 to the positive side of current source 91; said main switch may be the conventional ignition switch for the engine 207 (FIG. 4) and is closed naturally as shown, when the engine is running. Resistors 12, 13 and 15 are connected as shown, relative to said switch 11 and a transistor 14 which is a grounded emitter and inverter connection type in this specific embodiment. When the vehicle is running, a series of electrical impulses are thus applied as input signals to the base of transistor 14. Resistor 12 is bias resistor and resistor 15 is load resistor to the transistor which delivers thus a corresponding series of polarity inverted impulses, as illustrated in FIG. 5.

Numeral 16 represents a differentiating condenser which is connected together with resistor 17 and diode 18 to constitute a trigger circuit as shown by a chain-dotted line block, to a monostable multivibrator which includes transistors 19, 20 and 21, resistors 22, 23, 24 and 25, semi-fixed variable resistor 26 and condenser 27 connected with each other, as shown.

Numeral 28 represents a field-effect or MOS-FET type transistor, the drain side thereof being connected to said bus line 29 and the source side ground line 31 through load resistor 30. The first gate at $G_1$ is connected with condenser 32; and with a normally opened relay contact 34 of lead relay 33, respectively. The second gate at $G_2$ is connected with a potentiometer 35 which is operatively connected with an engine throttle valve 203, FIG. 4, although the connection means are not specifically shown, and with the emitter electrode of transistor 36 through lead 204, respectively.

The base electrode of transistor 21 is connected through lead 205 with the source side of said FET-transistor.

Resistor 37 and diodes 38; 39 constitute in combination an AND-gate, the output therefrom being fed to a first amplifier comprising transistors 40; 41 and resistors 42; 43; 44 and amplified invertedly therein.

Numeral 45a represents the coil fo a solenoid-operated valve assembly 45 shown in FIG. 4. As will be later described more fully hereinafter by reference to FIG. 4, when this solenoid 45a is actuated to open the valve 45, vacuum is transmitted from the suction manifold 207a of the vehicle engine 207 through suction piping 208 to a closable port 209 into a vacuum servo 206 which controls the throttle valve 203 through a flexible diaphragm 210 mounted in the servo 206. A motion-transmitting cable 211 extends between the servo and the throttle valve.

When the device is alternatively of the electromotor-driven type, said slolenoid coil 45a corresponds to the accelerator coil, although not shown.

In the present embodiment, when the solenoid coil 45a is energized, solenoid valve 45 is brought to its open position, thereby vacuum being introduced through the now open port 209 into the interior space of vacuum servo 206.

Numeral 46 represents a protecting diode which serves for absorbing surge voltages so as to protect the transistor 41.

Resistor 47 and diodes 48; 49 constitute in combination a second AND-gate, the output from the latter being fed to an amplifier constituted by transistors 50; 51 and resistors 52; 53; 54, for being amplified therein.

Solenoid-controlled valve assembly 55, FIG. 4, is provided for cooperation with a port 212, so as to keep the latter normally in its open position as shown, said port being provided at the servo 206 and kept normally in communication with open atmosphere through a conventional air filter 213 attached to said servo. With the solenoid valve kept in its open position, atmospheric pressure will be led to the interior of servo 206. When the constant speed travel device is alternatively of the electromotor-driven type, the solenoids corresponds to the decelerator winding of the motor.

In the present embodiment, when the solenoid coil 55a is energized as will be more fully described hereinafter, the solenoid valve 55 is brought into its actuated position for closing its mating port 212, thereby the invasion of atmospheric air pressure from outside into the interior of servo 206 being positively prevented.

Numeral 56 represents a protecting diode which is designed and arranged for absorbing surge voltages, so as to protect the transistor 51.

The combination of diode 57 and resistor 58 acts to bring the potential at the first gate of FET-transistor 28 towards ground potential when transistor 50 becomes conductive or in other words, when the AND-gate comprising diodes 48; 49 and resistor 47 in its off-state. Conversely, the combination of diode 59 and resistor 60 will act to bring the potential at the first gate $G_1$ of said FET-transistor 28 towards the source voltage when the output of the AND-gate comprising resistor 37 and diodes 38; 39 is off.

Transistors 61 and 62 constitute a setting or resume circuit, and numeral 63 represents solenoid coil of resume valve assembly 63, FIG. 4, which cooperates with a further port 214 which provided on the servo 206 and is kept in fluid communication through said filter or cleaner 213. With this valve 63 opened as shown, atmospheric air is conveyed rapidly through cleaner 213 and port 214 into the interior space of servo 206.

When the constant speed travel device is of the electromotor-driven type, corresponds to a winding of the electromagnetic clutch provided between the motor gearing and the throttle, although not shown.

Numeral 64 represents a load resistor to said transistor 62 and numerals 65 and 66 represent base-bias resistors thereof 67 shows a diode; 68 a base resistor of said transistor 61; 69 represents a condenser which acts upon said transistor 61 for retarding the operation thereof at a slight time lag. The aforementioned several parts are connected electrically as shown, so as to constitute a setting or resume circuit as demonstrated by a chain-dotted line block.

Numerals 70, 71 and 72 represent a series of three separate and independently manipulatable push button switches which can be conveniently fitted on a conventional driver's shift lever provided for speed control of the vehicle running speed, although not shown. Or alternatively, they can be fitted on the instrument panel near the driver's seat, although again not shown. Push button switch 70 serves for speed setting through a speed accelerating stage; second push button switch 71 serves again for speed setting a speed decelerating stage; third push button switch 72 serves for resuming normal operation.

When the first button switch 70 is closed, current will flow from diodes 73, 74, 75 and 76 to ground line 31. By manipulating second button switch 71 to "on," current will flow from diodes 77, 78, 79 and 80 to ground line 31.

If all these three button switches should be manipulated "on" erroneously, the arrangement will be at a speed-increasing stage, while these button switches be released to "off," the arrangement will be at a speed-decreasing stage.

Numeral 81 represents a bias resistor for transistor 62. When resume button switch 72 is closed, the base potential at transistor 62 is grounded. 82 and 83 represent respective diodes which are inserted in connecting leads 215 and 216 leading from the respective base electrodes of transistors 41 and 51 to the collector electrode of transistor 62.

Diode 84, resistor 85 and condenser 86 make in combination to bring said transistor 36 conductive when button switch 70 or 71 is closed.

When any of these switches 70 and 71 is opened, these elements 84, 85 and 86 act to render transistor 36 non-conductive after a short time lag. Semi-fixed resistor 87 is inserted between transistor 36 and ground 31. Stop switch 88 is so operatingly connected with the conventional foot-operated brake pedal, although not shown, that when the pedal is depressed, the stop switch is closed. Stop indicator lamp 89 is inserted between stop switch 88 and ground line 31. A condenser 92 is connected across lead relay 33, so as to retard the return operation of the latter.

Since the main or ignition switch 90 is kept in its closed position during travel of the vehicle, a series of electrical impulses, the duration of term of each of these impulses being responsive to occasional vehicle travel speed, will be applied to the base electrode of transistor 14 through the repeatedly on-off controlled detector 11, as was discussed hereinbefore. More specifically, when the detector 11 is in its open condition, the source voltage from the source 91 is applied to the base of transistor 14, so as to bring the latter into its conductive state. At the same time one of the transistors 19 included in the monostable multivibrator is concurrently brought into its conductive state, while the other transistor 20 is brought into its non-conducting state. The metastable period of the monostable multivibrator is determined by the combined resistance at 21, 26 and 27.

Transistors 19 and 20 are arranged as shown mutually in opposite phases. It is assumed that the width or duration period of each of the impulses when transistor 19 is in its non-conductive state be $\bar{B}$; that appearing at transistor 20 can be expressed by B, representing a NOT. On the other hand, when the similar pulse width or deceleration period with the detector 11 is kept open is assumed to be A, that appearing at transistor 19 may be expressed in logical term by $\bar{A}$.

Transistor 19 turns from its non-conductive to its conducting state when detector 11 is opened, and concurrently when the latter becomes the state of A, transistor 19 will become the state of $\bar{B}$. At this time, transistor 14 is in its state of $\bar{A}$, while transistor 20 is in its state of B. Therefore, the output from the first AND-gte comprising diodes 38; 39 and resistor 37 is at this time A·$\bar{B}$. Thus, it will be seen if the pulse width A is larger than pulse width B (this means that the width A of the occasional vehicle speed pulse is larger than the reference pulse width B, thus the vehicle is travelling at a slower speed than the reference or preset speed). In this case, the differential width which may be expressed by logically A (−) B can be taken out in the form of the AND-output.

On the other hand, an output of $\bar{A}$·B may be taken out from the second AND-gate comprising diodes 48; 49 and resistor 47, thus an output pulse having a width of B (−) A (which means the speed differential between the faster vehicle speed and the reference or preset vehicle speed may be obtained).

At this stage, when the vehicle driver manipulates the acceleratingly set switch 70 or the deceleratingly set switch 71, as the case may be, for attaining the desirous constant speed vehicle travel condition, the base potential at transistor 62 will drop and the transistor 62 turns "off," while, at the same time, the transistor 61 will become "on," thereby solenoid coil 63a being energized so as to close the solenoid valve 63. Thence, the base potential of transistor 62 will continue to drop through diode 67, and therefore, transistor 61 will be kept in its conducting state. At the same time, lead relay 33 is energized to close its contact 34, thereby the base potential at transistor 36 being reduced to its to its conductive state. During closure of relay contact 34, and when, under these conditions, vehicle speed pulse is longer in its width A than the pulse width B of the monostable transistor (which means that the occasional or practical vehicle speed is slower than the reference speed), the potential at the first gate $G_1$ of FET-transistor 28 will be raised through the action of diode 59 and resistor 60, and the last mentioned transistor will act in the conducting direction, while the transistor 21 is caused to act in its non-conducting direction. Therefore, the pulse width B at the output of the monostable multivibrator will become longer and longer, till the attainment of each pulse width at equal value : (A − B).

When conversely, when the vehicle speed pulse width A is shorter than the pulse width B at the output of the monostable, thus the practical vehicle speed being higher than the reference and the potential at first gate $G_1$ of FET-transistor 28 being lowered through the action of resistor 58, diode 57 and transistor 50. Therefore, the width of each of the generated pulses at the output of said monostable multivibrator will become shorter and shorter, till attainment of equalized pulse widths of these two kinds of pulses. In this way, a vehicle speed setting can be brought about to such effect that the pulse width A which corresponds to the practical vehicle speed is equal to the width B of the generated pulses at the multivibrator as the reference. The potential at the second gate $G_2$ at this time is determined by the value of semifixed resistor 87. As an example, when resistor 87 be zero, the potential at the second gate $G_2$ will become also zero irrespective of the set value of potentiometer 35 responsive to throttle opening degree, as far as the transistor 36 is in its conducting stage (resistor 85 and condenser 86 have been so dimensioned that the transistor 36 will continue its conducting state slightly longer than the period beginning from opening of set switches 70 and 71 to the returning of the return relay 33).

Further, by adjustment of semifixed resistor 87, the potential at $G_2$ can be applied at the presetting period of the reference vehicle speed with smaller variation of potential from the potentiometer 35. When the relay contact 34 is opened in this way upon equalization of the practical vehicle speed A with reference one B, the potential at $G_1$ of FET-transistor 28 is set to its certain fixed value by the action of condenser 32 and thus, the pulse width B of the generated pulses will also become fixed. Therefore, the practical or occasional vehicle speed at this time is brought into memory as establish to have the pulse width B.

The aforementioned overall operation can be more easily understood by reference to FIG. 5.

During the vehicle travel under this constant speed control, and when under these conditions a deviation of the vehicle running speed from the established and memorized reference value, the relative relation between the both will be such as:

$$A > B$$

Therefore, transistors 40; 41 will become conductive and solenoid coil 45a is energized so as to introduce vacuum into the interior space of the vacuum servo. Motion will be therefore transmitted therefrom through cable 211 to the throttle valve 203, FIG. 3, in further opening direction of the latter for increasing the mechanical output from the vehicle engine 207 and thus to increase the vehicle travelling speed towards the reference speed. With the increase of throttle opening degree, the potential at $G_2$ of FET-transistor 28 will be caused to increase correspondingly under the action of potentiometer 35 so as to affect the transistor in its conducting direction and transistor 21 in its non-conducting direction so that the reference pulse width B is elongated to a slight degree. In this way, the practical pulse width A is brought into registration with the reference pulse width B at a slightly lower level of the once preset reference speed value.

In this way, otherwise possible hunting phenomenon invited by excess or over-throttle opening may be positively prevented.

On the contrary, when the actual vehicle travel speed should exceed beyond the set reference value, the relation between the both kinds of pulse widths will become:

$$A < B$$

Therefore, transistor 50 will become conductive and transistor 51 will become non-conducting.

Therefore, current flow through solenoid 55a is interrupted and atmospheric air pressure will be introduced from outside into the interior of the vacuum servo, as was referred to hereinbefore, so as to act upon the engine throttle valve 203 towards its closed position for reducing the actual vehicle speed. At this time, the potential at $G_2$ of transistor FET-28 is reduced under the action of potentiometer 35, said transistor being acted upon thereby in its non-conducting direction and upon transistor 21 in its conducting direction so that the reference pulse width B is controlled to a slightly shorter value for the prevention of an over-due throttle opening.

When the brake pedal is depressed during this constant speed vehicle running condition, stop switch 88 is closed, so as to ignite stop indicator lamp 89 and to convert the transistor 62 from its non-conducting to conducting state. In this way, the base potential at the transistor 41 as well as 51 is lowered, so as to close vacuum valve 45 and to open atmospheric valve 55. Atmospheric air is therefore introduced into the interior of the vacuum servo 206. At the same time, transistor 61 becomes non-conducting and transistor 62 will become conducting so that the resume valve 63 is rapidly opened for bringing the interior space of the servo rapidly into its fulled position with atmospheric air. In this way, the throttle valve 203 is subjected to throttling action towards the idling position for the vehicle engine 207.

Thereafter, resume button switch 72 is depressed for recovering the once set constant or reference vehicle speed before the brake actuation, transistor 62 becomes non-conductive and transistor 61 becomes conductive, thus the desired vehicle speed recovery being restored.

Main difference between the improved and conventional techniques may be still better understood by reference to FIG. 2.

It is now assumed as an example that the vehicle is travelling through a ramp way onto a highway. When the actual vehicle speed attained at a desired high limit during the highly accelerated travel along the ramp way and the driver actuated the instructing member for constant speed running, the characteristic curve (1) passing through point B may be restored in the memory. At the same time, the relation with throttle valve opening angle $\theta_4$ corresponding to speed $V_1$ will be memorized.

Upon establishment of the vehicle speed in the above mentioned way, it is assumed that the vehicle travels along the even main highway, the vehicle will run at a constant speed $V_4$ corresponding to point A and with corresponding throttle opening angle $\theta_2$. Therefore, a speed deviation $(V_4 - V_1)$ will be encountered.

In the same way, a reference speed is set during a rapidly accelerating travel and then, the vehicle travels along a rising or descending slope, as the case may be, a speed deviation $(V_3 - V_1)$ or $(V_5 - V_1)$ will be encountered.

With use of the inventive device built in accordance with the foregoing first embodiment, however, in addition to memory of the speed $V_1$ at point B, zero throttle opening degree corresponding to point C will be brought into memory, regardless of the current throttle opening angle $\theta_4$. Therefore, when the vehicle travels along an even traffic surface upon establishment of a reference speed, the actual vehicle speed will become $V_0$ corresponding to the intersection point D determined by the curves (4) and (c). In the similar way, a reference speed has been set on a rising slope surface, and then, the vehicle travels along an even road surface, point E will be brought into memory, and the actual vehicle speed will become $V_2$ at the intersection F which is determined by the both curves (3) and (c).

Figure 7:
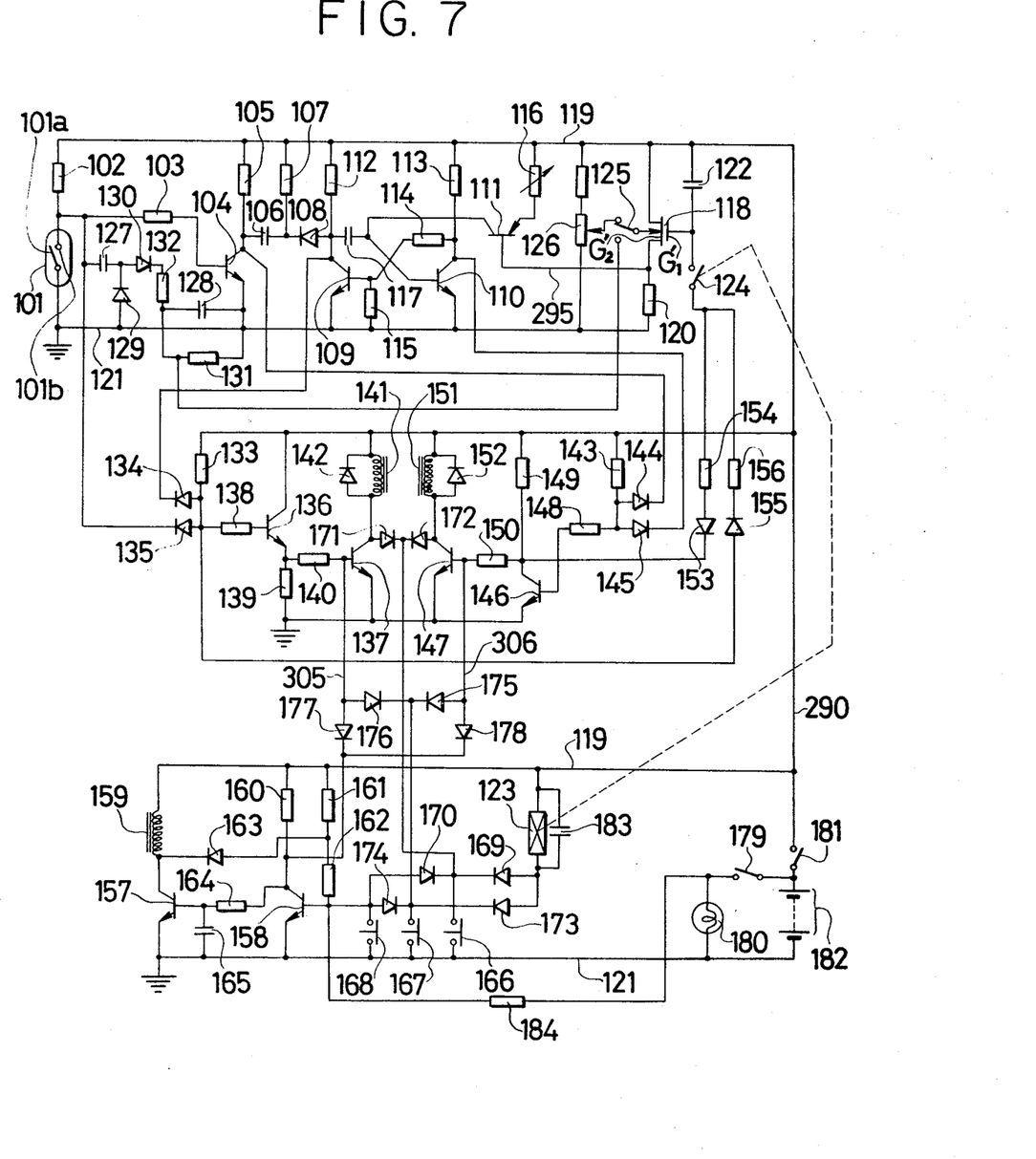
FIG. 7 is a similar view to FIG. 3, illustrative, however, of a second embodiment of the apparatus.

The above relationship may be better understood by reference to FIG. 7.

In the second embodiment shown, lead switch 101 having novable contact 101a and stationary contact 101b is practically same as before at 11. Resistors 102, 103 and 105 and transistor 104 correspond respective elements 12, 13, 15 and 14, respectively.

Condenser 106, resistor 107, diode 108, transistors 109, 110, and 111, resistors 112, 113, 114 and 115, semi-fixed variable resistor 116 and condenser 117 constitute as before a monostable or one-shot multivibrator and its trigger.

In the present embodiment, circuit elements 118; 119; 120; 121; 122; 123 and 124 correspond respective foregoing elements 28; 29; 30; 31; 32; 33 and 34, respectively. First and second gates $G_1'$ and $G_2'$ correspond foregoing gates $G_1$ and $G_2$, respectively.

First gate $G_1'$ is connected with condenser 122; and normally open contact 124 of lead relay 123. Second gate $G_2'$ is connected with common contact of switch 125 operated by lead relay 123. Normally closed contact of said switch 125 is connected with the slider of potentio 126 operatively connected with throttle valve as at 203 in FIG. 3. Normally open contact of said switch 125 is connected to the output of a vehicle speed-responsive voltage generator comprising condensers 127 and 128, diodes 129 and 130 and resistors 131 and 132 connected with each other as shown.

Substantial further circuit components are similar to those correspondingly employed in the foregoing first embodiment, the following table will clearly show the correspondency:

| 133 | 37; | 134 | 38; | 135 | 39; |
|---|---|---|---|---|---|
| 136 | 40; | 137 | 41; | 138 | 42; |
| 139 | 43; | 140 | 44; | 141 | 45a; |
| 142 | 46; | 143 | 47; | 144 | 48; |
| 145 | 49; | 146 | 50; | 147 | 51; |
| 148 | 52; | 149 | 53; | 150 | 54; |
| 151 | 55a; | 152 | 56; | 153 | 57; |
| 154 | 58; | 155 | 59; | 156 | 60; |
| 157 | 61; | 158 | 62; | 159 | 63; |
| 160 | 64; | 161 | 65; | 162 | 66; |
| 163 | 67; | 164 | 68; | 165 | 69; |
| 166 | 70; | 167 | 71; | 168 | 72; |
| 169 | 73; | 170 | 74; | 171 | 75; |
| 172 | 76; | 173 | 77; | 174 | 78; |
| 175 | 79; | 176 | 80; | 177 | 82; |
| 178 | 83; | 179 | 88; | 180 | 89; |
| 181 | 90; | 182 | 91; | 183 | 92; |
| 290 | 200; | 295 | 205; | 305 | 215; |
| 306 | 216; | 184 | 81. | | |

The embodiments of the invention in which an exclusive property of privilege is claimed are as follows:

1. A method for control of vehicle travel at a constant speed comprising:

obtaining an electrical signal responsive to actual vehicle speed;

obtaining a negative feedback electrical signal responsive to the opening degree of a throttle valve;

modifying said negative feedback signal to a predetermined value during operation of a desired vehicle speed establishing means and storing said actual vehicle speed signal in a memory, as a desired vehicle speed signal; and varying said desired vehicle speed signal in accordance with said feedback signal;

bringing said vehicle speed responsive signal into coincidence with said desired vehicle speed signal.

2. A method for control of vehicle travel at a constant speed comprising:

forming a vehicle speed responsive electrical signal;

forming a negative feedback electrical signal responsive to opening degree of a throttle valve;

obtaining an electrical signal responsive to throttle valve opening degree, thereby providing a pseudo throttle valve opening responsive signal during travel of the vehicle on an even traffic surface, being deduced from said vehicle speed responsive signal;

replacing said negative feedback signal by said pseudo signal and storing said vehicle speed responsive signal in a memory as a desired vehicle speed establishing signal, during operation of means for establishing the desired vehicle speed;

varying said desired vehicle speed signal in accordance with said feedback signal; and bringing said vehicle speed responsive signal into coincidence with said desired vehicle speed signal when there is a difference between said signals.

3. Apparatus for constant speed control of vehicle travel speed, comprising:

a first electrical circuit providing an electrical signal responsive to actual vehicle speed;

a second electric circuit for providing a second electric signal responsive to desired vehicle speed;

a third electric circuit including a potentiometer for obtaining a negative feedback signal responsive to throttle valve opening degree, said third circuit being connected with said second circuit, for varying said desired vehicle speed;

means for establishing the desired vehicle speed;

a fourth electric circuit for storing the desired vehicle speed signal in said second circuit;

a fifth electric circuit for fixedly maintaining the negative feedback signal from said third circuit during operation of the means for establishing the desired vehicle speed; and a sixth circuit for comparing the output signal from said first circuit with the desired vehicle speed and bringing said output signal from said first circuit into coincidence with the desired vehicle speed signal, if there is a difference between said signals.

4. The apparatus of claim 3, wherein said first circuit comprises a detector adapted for generation of an electrical pulse responsive to vehicle speed and means for inverting said pulses.

5. The apparatus of claim 3, wherein said second circuit comprises means for determination of a quasi-stabilization period, said second circuit being adapted for generation of pulse the width of which is responsive to said determination means.

6. The apparatus of claim 3, wherein said fourth circuit comprises a field-effect transistor capable of operating in response to a difference between the respective outputs from said first and second circuits during operation of said desired vehicle speed means, said quasi-stabilization time determining means of said second circuit being controlled by said transistor, for bringing thereby the output from said second circuit into coincidence with the output from said first circuit during operation of said desired vehicle speed means, thereby storing the output from said first circuit in said second circuit.

7. The apparatus of claim 6, wherein said field-effect transistor comprises a first gate having electrical potential capable of rising when the pulse width as the output signal from said first circuit is larger than that at the output from said second circuit, and vice versa, and a second gate adapted for control of transistor means included in said quasi-stabilization period determination means into its non-conductive state with an increase of the potential at said first gate, for bringing the widths of respective output pulses from said first and second circuits into coincidence with each other, or for bringing said transistor means into its conducting state, so as to bring the respective pulse widths of outputs from said first and second circuits into coincidence with each other.

* * * * *